United States Patent
Singh (10) Patent No.: US 12,327,315 B2
(45) Date of Patent: Jun. 10, 2025

(54) SYSTEM AND METHOD FOR AUTO-GENERATING AND SHARING CUSTOMIZED VIRTUAL ENVIRONMENTS

(71) Applicant: Bank of America Corporation, Charlotte, NC (US)

(72) Inventor: Shailendra Singh, Thane West (IN)

(73) Assignee: Bank of America Corporation, Charlotte, NC (US)

( * ) Notice: Subject to any disclaimer, the term of this patent is extended or adjusted under 35 U.S.C. 154(b) by 290 days.

(21) Appl. No.: 18/049,372

(22) Filed: Oct. 25, 2022

(65) Prior Publication Data

US 2024/0135649 A1 Apr. 25, 2024
US 2024/0233272 A9 Jul. 11, 2024

(51) Int. Cl.
| | |
|---|---|
| G06T 19/00 | (2011.01) |
| G06F 21/31 | (2013.01) |
| G06T 13/40 | (2011.01) |
| G06V 10/70 | (2022.01) |
| G06V 40/20 | (2022.01) |

(52) U.S. Cl.
CPC ............ *G06T 19/00* (2013.01); *G06F 21/316* (2013.01); *G06T 13/40* (2013.01); *G06V 10/70* (2022.01); *G06V 40/20* (2022.01); *G06T 2219/024* (2013.01)

(58) Field of Classification Search
CPC ........ G06V 19/00; G06V 10/70; G06V 40/20; G06F 21/316; G06T 13/40; G06T 2219/024

USPC ......................................................... 345/419
See application file for complete search history.

(56) References Cited

U.S. PATENT DOCUMENTS

| | | |
|---|---|---|
| 8,902,227 B2 | 12/2014 | Harrison |
| 9,335,889 B2 | 5/2016 | Tan et al. |
| 9,426,763 B2 | 8/2016 | Wentink et al. |
| 9,645,394 B2 | 5/2017 | Kinnebrew et al. |
| 10,031,656 B1 | 7/2018 | Tseng et al. |
| 10,346,379 B2 | 7/2019 | Walkingshaw et al. |
| 10,740,804 B2 | 8/2020 | Spivack |
| 10,796,697 B2 | 10/2020 | Somech et al. |
| 10,884,595 B2 | 1/2021 | Son et al. |
| 10,930,076 B2 | 2/2021 | Bogue et al. |
| 11,012,455 B2 | 5/2021 | Backer et al. |
| 11,024,086 B2 | 6/2021 | Tate-Gans et al. |

(Continued)

*Primary Examiner* — Jin Ge (57) ABSTRACT

A system for auto-generating and sharing customized virtual environments comprises a processor associated with a server. The processor detects an avatar associated with a user device interacting with virtual environment objects in a virtual environment for an interaction with an entity. The processor generates user data objects associated with the interaction and a user profile. The processor extracts user behavior objects and user device objects from the user data objects. The processor applies a machine learning model to map the user behavior objects and the user device objects to the virtual environment objects. The processor integrates the user behavior objects and the user device objects with the virtual environment objects into a set of interaction objects based on the mapping. The processor determines customized environment virtual objects based on the interaction objects. The processor renders the customized virtual environment objects in a customized virtual environment corresponding to the interaction.

17 Claims, 3 Drawing Sheets

(56) References Cited

U.S. PATENT DOCUMENTS

| | | |
|---|---|---|
| 11,257,170 B2 | 2/2022 | Dange |
| 11,341,534 B2 | 5/2022 | Du |
| 11,557,093 B1* | 1/2023 | Terrano .................. A63F 13/26 |
| 2011/0007079 A1* | 1/2011 | Perez ...................... A63F 13/56 |
| | | 345/473 |
| 2014/0282874 A1* | 9/2014 | Bennette ............... H04L 63/102 |
| | | 726/3 |
| 2018/0096505 A1 | 4/2018 | Valdivia et al. |
| 2018/0373413 A1* | 12/2018 | Sawaki ................ H04N 13/332 |
| 2019/0278882 A1 | 9/2019 | Punako, Jr. et al. |
| 2019/0370926 A1 | 12/2019 | Hagland |
| 2020/0110865 A1* | 4/2020 | Wu ....................... G02B 27/017 |
| 2023/0130770 A1* | 4/2023 | Miller .................... G06N 20/00 |
| | | 345/156 |

* cited by examiner

SYSTEM AND METHOD FOR AUTO-GENERATING AND SHARING CUSTOMIZED VIRTUAL ENVIRONMENTS

TECHNICAL FIELD

The present disclosure relates generally to network communications and information security, and more specifically to a system and method for auto-generating and sharing customized virtual environments.

BACKGROUND

Interactions may be performed between user devices associated with users and an entity in a metaverse system. The same metaverse environment may generally be provided to the users for their interactions with the entity for an application service. It is challenging to provide metaverse environments to dynamically and effectively fulfill user individual needs or preferences and respond to changing events caused by particular users actions or user device operations during the interactions.

SUMMARY

Conventional technology is not configured to auto-generate and share customized virtual environments in a virtual environment system (e.g., such as a metaverse). The system described in the present disclosure is particularly integrated into a practical application of auto-generating and sharing customized virtual environments based on user behaviors and user device operations during interactions in a virtual environment.

The disclosed system is configured to dynamically generate customized virtual environments based on user behaviors or preferences for an avatar associated with a user device (e.g., augmented reality (AR)/virtual reality (VR) headset) to interact with an entity. The disclosed system extracts user behavior objects and user device objects from user data objects which are generated during an interaction. The disclosed system is configured to apply a machine learning model to map the user behavior objects and the user device objects to corresponding virtual environment objects in the virtual environment for generating a customized virtual environment. The user behavior objects and the user device objects are integrated with the corresponding virtual environment objects into a set of interaction objects. The disclosed system is configured to generate customized virtual environment objects 148 based on the interaction objects. The customized virtual environment objects 148 may be rendered in a customized virtual environment corresponding to the interaction. The disclosed system is further configured to modify the customized virtual environment in synchronization with updated user behavior objects and user device objects associated with the virtual environment objects in real-time.

In one embodiment, the disclosed system for auto-generating and sharing customized virtual environments comprises a processor and a memory. The memory is operable to store a plurality of user profiles. Each user profile comprises authentication data configured to authorize a user device associated with a user to perform an interaction with an entity associated with a real-world environment. The processor detects an avatar associated with the user device and the user interacting with a set of virtual environment objects in a virtual environment for an interaction with the entity. The processor generates a set of user data objects associated with the interaction and a user profile. The processor extracts a set of user behavior objects and a set of user device objects from the set of the user data objects. Each user behavior object is associated with a type of user behavior corresponding to at least one virtual environment object. Each user device object corresponds to the at least one virtual environment object and is detected by the user device during the interaction. The processor may apply a machine learning model to map the set of user behavior objects and the set of user device objects to the set of the virtual environment objects in the virtual environment. The processor integrates the set of the user behavior objects and the set of the user device objects with the set of the virtual environment objects into a set of interaction objects. The processor determines a plurality of customized environment virtual objects for the interaction based on the set of the interaction objects. The processor renders the plurality of the customized virtual environment objects in a customized virtual environment corresponding to the interaction.

The present disclosure presents a practical application that may be implemented by the processor of the server for an avatar associated with a user device to perform interactions in customized virtual environments based on user behaviors or preferences. The server may apply a machine learning model to analyze user behaviors and user device operations to generate customized virtual environments dynamically. The server may modify the customized virtual environment in synchronization with changes of the user behaviors and user device operations in the customized virtual environment during the interaction. Further, the customized virtual environments may be shared between users based on their user interaction patterns to implement the corresponding application services. For example, the system may identify that users have the same user behaviors, user interaction patterns, and context information during their interactions. The server may present the customized virtual environment objects generated based on the same user behavior and interaction patterns for the users to share for performing their interactions. In this way, these processes conserve processing resources because the users and user devices do not need to go through unnecessary processes as they interact with the entity to fulfill user individual needs in a customized virtual environment. The use device associated with the user may complete the application service through the avatar in the virtual environment faster and more efficiently.

Further, the practical application leads to technical advantages of improving application service efficiency to the overall computer system since it automatically and dynamically generates customized virtual environments in real-time based on user behaviors and user device operations corresponding to changes to virtual environment objects during the interactions. The disclosed system develops dynamic customized virtual environments where users can feel seamless integration with optimized virtual environments with respect to their individual needs or preferences to implement application services faster and easier. Thus, the disclosed system improves computer system processing and interaction operation efficiency of the overall computer system.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Previous technologies fail to provide efficient and reliable solutions to provide virtual environments to dynamically fulfill user needs and respond to changing events caused by users behaviors and user device operations during interactions. This disclosure presents a system for auto-generating and sharing customized virtual environments corresponding to user behaviors and user device operations by referring to FIGS. 1-3.

System Overview

Figure 1:
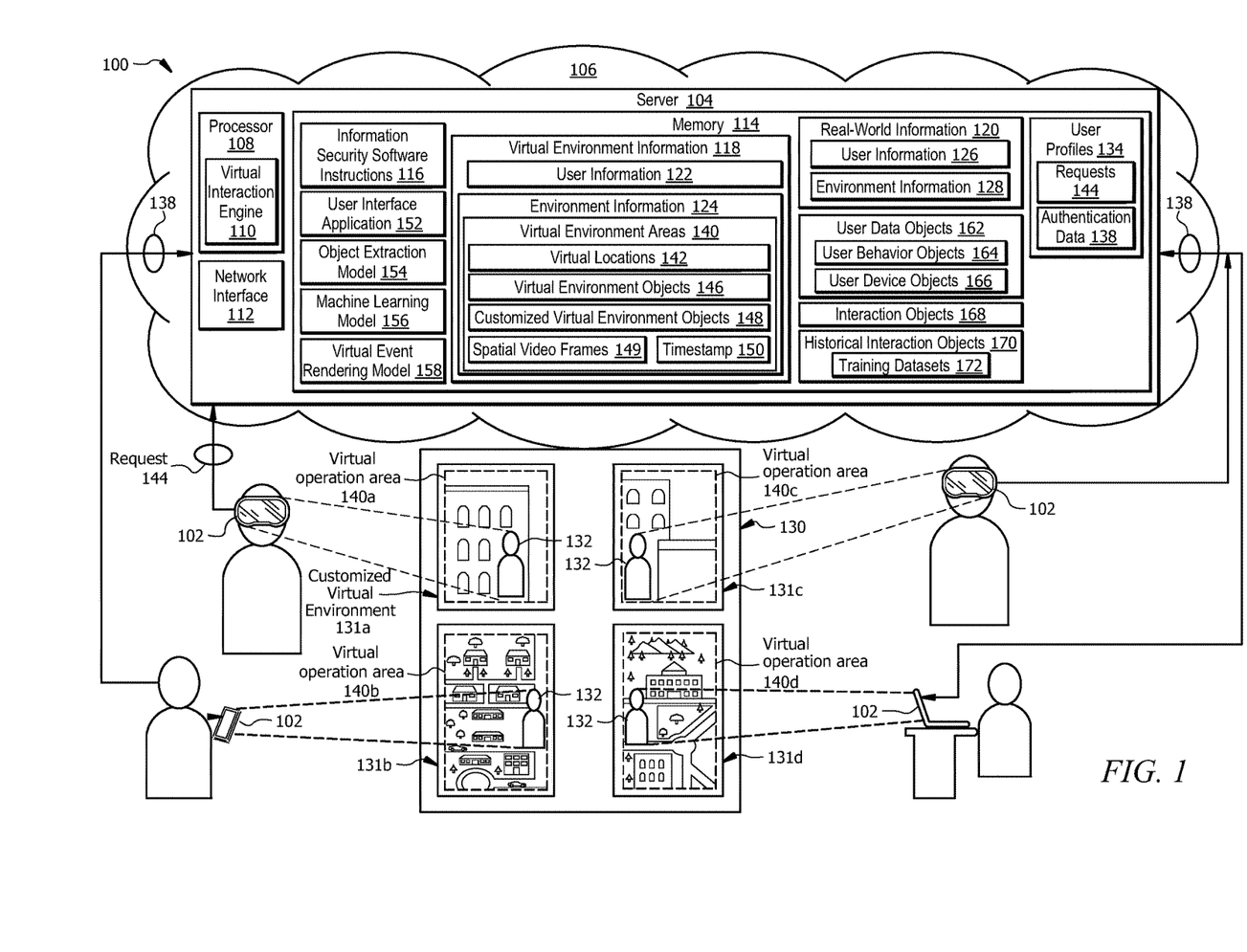
FIG. 1 illustrates an embodiment of a system configured to auto-generate and share customized virtual environments.

FIG. 1 illustrates one embodiment of a system 100 that is configured to auto-generate and share customized virtual environments for users to perform interactions through user devices 102 and avatars 132 with an entity. In one embodiment, system 100 comprises a server 104, one or more user devices 102, and a network 106. The system 100 may be communicatively coupled to the network 106 and may be operable to transmit data between each user device 102 and the server 104 through the network 106. Network 106 enables the communication between components of the system 100. Server 104 comprises a processor 108 in signal communication with a memory 114. Memory 114 stores information security software instructions 116 that when executed by the processor 108, cause the processor 108 to execute one or more functions described herein.

In some embodiments, the system 100 may be implemented by the server 104 to auto-generate customized virtual environments 131 with seamless integration with user needs and preferences for an avatar 132 associated with a user device 102 to implement an interaction with an entity. For example, the server 104 may extract user behavior objects 164 and user device objects 166 from user data objects 162 of the interaction. The server 104 may apply a machine learning model 156 to map the user behavior objects 164 and the user device objects 166 to corresponding virtual environment objects 146 in a virtual operation area 140 in a virtual environment 130. The server 104 may integrate the user behavior objects 164 and the user device objects 166 with the corresponding virtual environment objects 146 into a set of interaction objects 168. The server 104 may generate customized virtual environment objects 148 based on the interaction objects 168. The customized virtual environment objects 148 may be rendered in a customized virtual environment 131 corresponding to the interaction. The server 104 may update the user behavior objects 164 and the user device objects 166 in real time based on the detected new user behaviors and new parameters through the user device 102. The customized virtual environment 131 may be modified in synchronization with the updated user behavior objects 164 and the user device objects 166 to facilitate a user seamless interaction in real-time.

System Components

Network

The network 106 may include any interconnecting system capable of transmitting audio, video, signals, data, messages, or any combination of the preceding. The network 106 may include all or a portion of a local area network, a metropolitan area network, a wide area network, an overlay network, a software-defined network a virtual private network, a packet data network (e.g., the Internet), a mobile telephone network (e.g., cellular networks, such as 4G or 5G), a Plain Old Telephone network, a wireless data network (e.g., Wi-Fi, WiGig, WiMax, etc.), a Long Term Evolution network, a Universal Mobile Telecommunications System network, a peer-to-peer network, a Bluetooth network, a Near Field Communication network, a Zigbee network, and/or any other suitable network. The network 106 may be configured to support any suitable type of communication protocol as would be appreciated by one of ordinary skill in the art.

User Devices

A user device 102 is a hardware device that is generally configured to provide hardware and software resources to a user. Examples of a user device 102 include, but are not limited to, a virtual reality device, an augmented reality device, a laptop, a computer, a smartphone, a tablet, a smart device, an Internet-of-Things (IoT) device, or any other suitable type of device. The user device 102 may comprise a graphical user interface (e.g., a display), a touchscreen, a touchpad, keys, buttons, a mouse, or any other suitable type of hardware that allows a user to view data and/or to provide inputs into the user device 102.

Each user device 102 is configured to display a two-dimensional (2D) or three-dimensional (3D) representation of a virtual environment 130 to a user. Each user device 102 is further configured to allow a user to send an interaction request or request 144 for the user device 102 to access and navigate through virtual operation areas 140 in the virtual environment 130 to interact with the server 104. As another example, a user may use a user device 102 to send an interaction request 144 that requests a transfer of real-world resources and/or virtual resources between the user device 102 and the server 104. Example processes are described in more detail below in FIG. 3.

Each user device 102 is configured to display a two-dimensional (2D) or three-dimensional (3D) representation of a virtual environment 130 to a user. Within the virtual environment 130, each user may be associated with a user device 102 and an avatar 132. An avatar 132 is a graphical representation of the user device 102 associated with the user and the user profile 134 within the virtual environment 130. Examples of the avatars 132 include, but are not limited to, a person, an animal, or an object. In some embodiments, the features and characteristics of the avatar 132 may be customizable and user defined. For example, the size, shape, color, attire, accessories, or any other suitable type of appearance features may be specified by a user. By using the avatar 132, a user or the user device 102 can move within the virtual environment 130 to interact with an entity associated with the server 104 or other avatars 132 and objects within the virtual environment 130.

Figure 2:
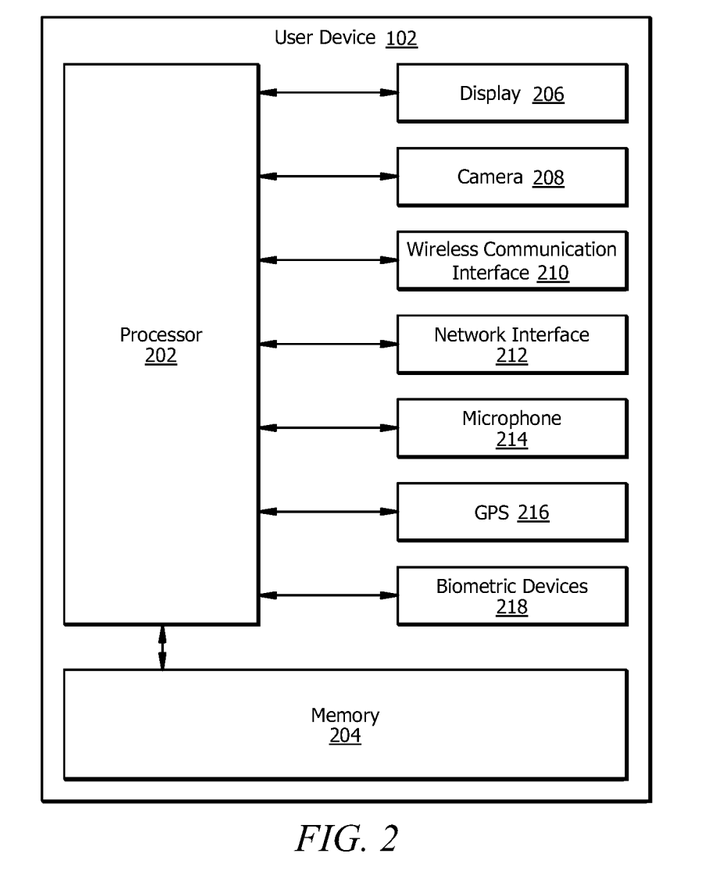
FIG. 2 is a block diagram of an example user device of the system of FIG. 1.

FIG. 2 is a block diagram of an embodiment of the user device 102 used by the system of FIG. 1. The user device 102 may be configured to display the virtual environment 130 (referring to FIG. 1) within a field of view of the user (referring to FIG. 1), capture biometric, sensory, and/or physical information of the user wearing and operating the user device 102, and to facilitate an electronic interaction between the user and the server 104. The user device 102 comprises a processor 202, a memory 204, and a display 206. The processor 202 comprises one or more processors operably coupled to and in signal communication with memory 204, display 206, camera 208, wireless communication interface 210, network interface 212, microphone 214, GPS sensor 216, and biometric devices 218. The one or more processors is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor 202 may be a programmable logic device, a microcontroller, a microprocessor, or any suitable combination of the preceding. The one or more processors are configured to process data and may be implemented in hardware or software. For example, the processor 202 may be 8-bit, 16-bit, 32-bit, 64-bit or of any other suitable architecture. The processor 202 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions to implement the function disclosed herein, such as some or all of those described with respect to FIGS. 1 and 3. For example, processor 202 may be configured to display virtual objects on display 206, detect user location, identify virtual sub, capture biometric information of a user, via one or more of camera 208, microphone 214, and/or biometric devices 218, and communicate via wireless communication interface 210 with server 104 and/or other user devices 102.

Figure 3:
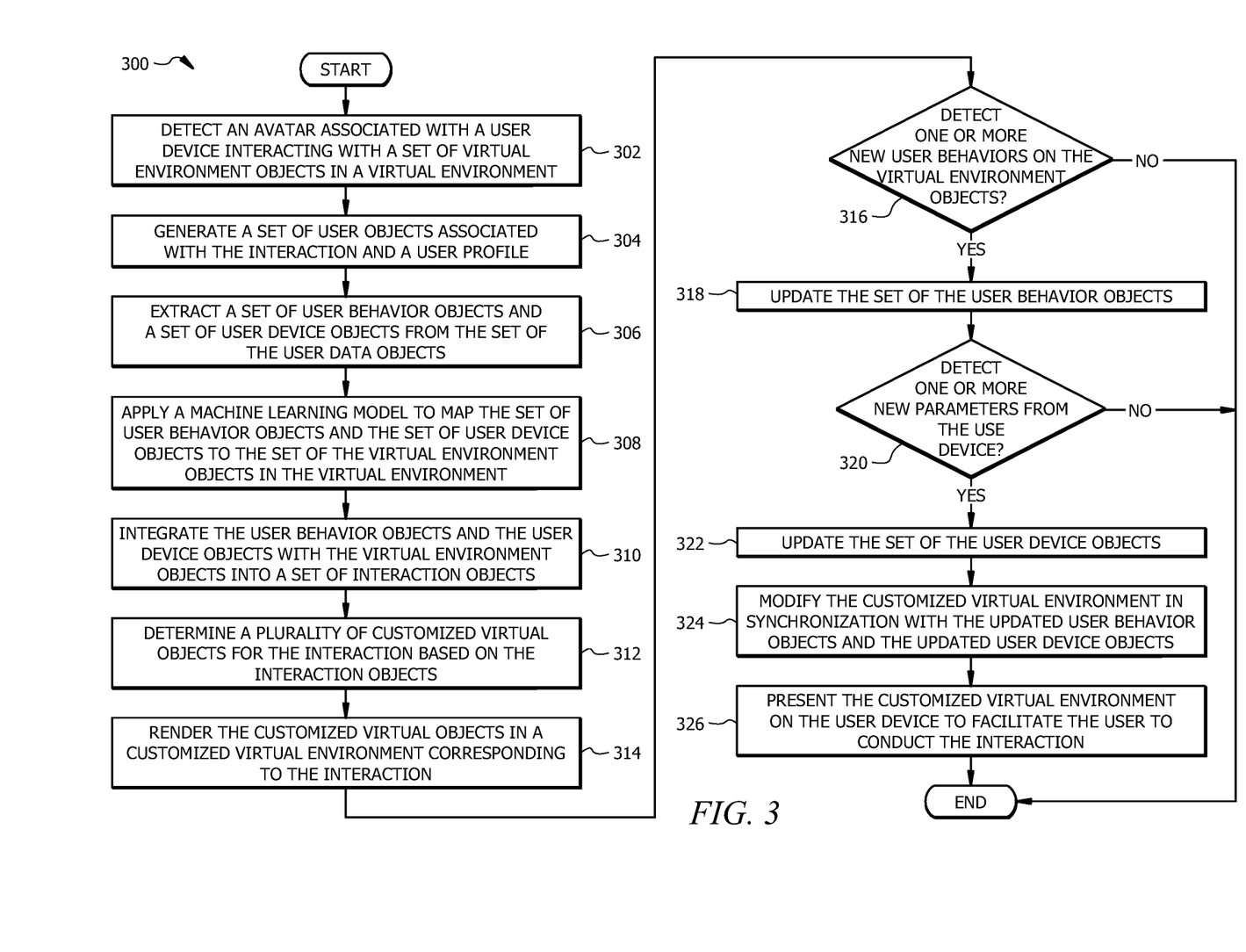
FIG. 3 illustrates an example operational flow of a method for auto-generating and sharing customized virtual environments.

Memory 204 is operable to store any of the information described with respect to FIGS. 1 and 3 along with any other data, instructions, logic, rules, or code operable to implement the function(s) described herein when executed by processor 202. The memory 204 comprises one or more disks, tape drives, or solid-state drives, and may be used as an over-flow data storage device, to store programs when such programs are selected for execution, and to store instructions and data that are read during program execution.

Display 206 is configured to present visual information to a user (for example, user in FIG. 1) in an augmented reality environment that overlays virtual or graphical objects onto tangible objects in a real scene in real-time. In other embodiments, the display 206 is configured to present visual information to the user as the virtual environment 130 (referring to FIG. 1) in real-time. In an embodiment, display 206 is a wearable optical display (e.g., glasses or a headset) configured to reflect projected images and enables a user to see through the display 206. For example, display 206 may comprise display units, lens, semi-transparent mirrors embedded in an eye glass structure, a visor structure, or a helmet structure. Examples of display units include, but are not limited to, a cathode ray tube (CRT) display, a liquid crystal display (LCD), a liquid crystal on silicon (LCOS) display, a light emitting diode (LED) display, an active matrix OLED (AMOLED), an organic LED (OLED) display, a projector display, or any other suitable type of display as would be appreciated by one of ordinary skill in the art upon viewing this disclosure. In another embodiment, display 206 is a graphical display on a user device 102. For example, the graphical display may be the display of a tablet or smart phone configured to display an augmented reality environment with virtual or graphical objects overlaid onto tangible objects in a real scene in real-time environment and/or virtual environment 130.

Camera 208 is configured to capture images of a wearer of the user device 102. Camera 208 may be configured to capture images continuously, at predetermined intervals, or on-demand. For example, camera 208 may be configured to receive a command from the user to capture an image. In another example, camera 208 is configured to continuously capture images to form a video stream. Camera 208 is communicably coupled to processor 202.

Wireless communication interface 210 is configured to facilitate processor 202 in communicating with other devices. Wireless communication interface 210 is configured to employ any suitable communication protocol.

Network interface 212 may be configured to use any suitable type of communication protocol and enable wired and/or wireless communications as would be appreciated by one of ordinary skill in the art.

Microphone 214 is configured to capture audio signals (e.g., voice signals or commands) from a user. Microphone 214 is communicably coupled to processor 202.

GPS sensor 216 is configured to capture and to provide geographical location information. For example, GPS sensor 216 is configured to provide a geographic location of a user device 102 associated with a user. GPS sensor 216 may be configured to provide the geographic location information as a relative geographic location or an absolute geographic location. GPS sensor 216 may provide the geographic location information using geographic coordinates (i.e., longitude and latitude) or any other suitable coordinate system. GPS sensor 216 is communicably coupled to processor 202.

Examples of biometric devices 218 may include, but are not limited to, retina scanners and fingerprint scanners. Biometric device 218 is communicably coupled to processor 202. Biometric devices 218 are configured to capture information about a person's physical characteristics and to output a biometric signal based on captured information.

Server

Referring back to FIG. 1, the server 104 is a hardware device that is generally configured to provide services and software and/or hardware resources to user devices 102. The server 104 is generally a server, or any other device configured to process data and communicate with user devices 102 via the network 106. The server 104 is generally configured to oversee the operations of a virtual interaction engine 110, as described further below in conjunction with the operational flows of the method 300 described in FIG. 3. In particular embodiments, the server 104 may be implemented in the cloud or may be organized in either a centralized or distributed manner.

Processor

The processor 108 is a hardware device that comprises one or more processors operably coupled to the memory 114. The processor 108 is any electronic circuitry including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The processor 108 is communicatively coupled to and in signal communication with the memory 114 and the network interface 112. The one or more processors are configured to process data and may be implemented in hardware or software. For example, the processor 108 may be 8-bit, 16-bit, 32-bit, 64-bit, or of any other suitable architecture. The processor 108 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. The processor 108 may be a special-purpose computer designed to implement the functions disclosed herein.

In an embodiment, the virtual interaction engine 110 is implemented using logic units, FPGAs, ASICs, DSPs, or any other suitable hardware. The virtual interaction engine 110 is configured to operate as described in FIG. 3. The virtual interaction engine 110 may be configured to perform the operations of the method 300 as described in FIG. 3. For example, the virtual interaction engine 110 may be configured to auto-generate customized virtual environments 131 for users to perform interactions with an entity in the virtual environment 130. As another example, the virtual interaction engine 110 may be configured to share customized virtual environments 131 between users within a virtual environment 130.

The memory 114 stores any of the information described above with respect to FIGS. 1-3 along with any other data, instructions, logic, rules, or code operable to implement the function(s) described herein when executed by the processor 108. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information security software instructions 116, user profiles 134, user data objects 162, interaction objects 168, historical interaction objects 170 with training datasets 172, virtual environment information 118, real-world information 120, and/or any other data or instructions. The user data objects 162 may include user behavior objects 164 and user device objects 166.

The information security software instructions 116 may comprise any suitable set of instructions, logic, rules, or code operable to execute the virtual interaction engine 110. In an example operation, the memory 114 may store a user interface application 152, an object extraction model 154, a machine learning model 156, a virtual event rendering model 158, and other program models which are executed by the processor 108 to implement operational flows of the system of FIG. 1.

A user profile 134 includes authentication data 138 and interaction requests 144 from users. Authentication data 138 may include user login credentials and may be configured to provide authentication for a user device 102 to interact with systems or platforms associated with an entity at a plurality of physical locations in a real-world environment. Authentication data 138 may be configured to provide authentication for an avatar 132 associated with the user device 102 to navigate in a virtual environment 130. The server 104 may verify user authentication based on authentication data 138 of the user profile 134 to grant an authentication to the avatar 132 to access virtual operation areas 140 to interact with the entity. A user profile 134 further includes one or more of user identifiers, username, physical address, email address, phone number, personal preference, disability information, and any other data, such as documents, files, media items, etc. The plurality of user profiles 134 may be stored by the processor 108 in the memory 114.

The virtual environment information 118 comprises user information 122 and environment information 124. The user information 122 generally comprises information that is associated with any user profiles associated with users and user accounts, digital assets information, or any other suitable type of information that can be used within a virtual environment 130. The environment information 124 includes data of virtual operation areas 140*a*-140*d*. Each virtual operation area 140 includes a corresponding virtual location 142, a set of virtual environment objects 146, and a set of customized virtual environment objects 148. The environment information 124 generally comprises information about the appearance of a virtual environment 130. For example, the environment information 124 may comprise information associated with objects, landmarks, buildings, structures, avatars 132, virtual operation areas 140, or any other suitable type of element that is present within a virtual environment 130. In some embodiments, the environment information 124 may be used to create a representation of a virtual environment 130 and different customized virtual environments 131 (e.g., 131*a*-131*d*) for users. In this case, a virtual environment 130 may be implemented using any suitable type of software framework or engine.

Examples of a virtual environment 130 include, but are not limited to, a graphical or virtual representation of a metaverse, a map, a city, a building interior, a landscape, a fictional location, an alternate reality, or any other suitable type of location or environment. A virtual environment 130 may be configured to use realistic or non-realistic physics for the motion of objects within the virtual environment 130. For example, some virtual environment 130 may be configured to use gravity whereas other virtual environment 130 may not be configured to use gravity.

The real-world information 120 comprises user information 126 and environment information 128. The user information 126 generally comprises information that is associated with user profiles and user accounts that can be used within the real world. For example, user information 126 may comprise user profile information, account information, or any other suitable type of information that is associated with a user within a real-world environment. The environment information 128 generally comprises information that is associated with an entity within the real world that the user is a member of or is associated with. For example, the environment information 128 may comprise physical addresses, GPS based locations, phone numbers, email addresses, contact names, or any other suitable type of information that is associated with an entity. Since the server 104 has access to both the virtual environment information 118 and the real-world information 120, the server 104 may link the virtual environment information 118 and the real-world information 120 together for a user such that changes to the virtual environment information 118 affect or propagate to the real-world information 120 and vice-versa. The server 104 may be configured to store one or more maps that translate or convert different types of interactions between the real-world environment 120 and the virtual environment 130 and vice-versa.

The server 104 may generate a virtual environment 130 based on the virtual environment information 118 and the real-world information 120. In some embodiments, the virtual environment 130 comprises a plurality of associated virtual operation areas 140. In one embodiment, the virtual operation areas 140 may be configured and executed by the processor 108 to provide one or more services provided by an entity at different physical locations in the real-world environment. The server 104 may be configured to store one or more maps executed by the processor 108 that translate or convert different types of interactions occurred in the virtual operation areas 140 between the real-world environment 120 and the virtual environment 130 and vice-versa.

Within the virtual environment 130, an avatar 132 is generated by the processor 108 as a graphical representation of a user device 102 within the virtual environment 130. The avatar 132 includes a plurality of features and characteristics which are processed by the processor 108 to present the avatar 132 as the graphical representation of a user device 102 in the virtual environment 130. For example, the server 104 may receive a signal indicating a physical location of the user device 102 and/or detect the user device 102 in the real-world environment. The server 104 may store the received signal in the memory 114. The server 104 may determine a virtual location 142 of the avatar 132 associated with the user device 102 in the virtual environment 130 based on the physical location of the user device 102. The server 104 may obtain the environment information 124 and environment information 128 associated with the virtual location 142 and physical location of the user device 102. The server 104 may generate and present an avatar 132 in the virtual environment 130 based on the user profile 134, the obtained environment information 124 and environment information 128.

The network interface 112 is a hardware device that is configured to enable wired and/or wireless communications. The network interface 112 is configured to communicate data between user devices 102 and other devices, systems, or domains. For example, the network interface 112 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 108 is configured to send and receive data using the network interface 112. The network interface 112 may be configured to use any suitable type of communication protocol as would be appreciated by one of ordinary skill in the art.

Virtual Interaction Engine

Virtual interaction engine 110 may include, but is not limited to, one or more separate and independent software and/or hardware components of a server 104. In some embodiment, the virtual interaction engine 110 may be implemented by the processor 108 by executing the information security software instructions 116 to create a virtual environment 130 with a plurality of virtual operation areas 140a-140d. The virtual interaction engine 110 may be implemented by the processor 108 by executing a user interface application 152, an object extraction model 154, a machine learning model 156, and a virtual event rendering model 158 to auto-generate and share customized virtual environments 131a-131d for performing interactions between users and an entity in a virtual environment system.

In some embodiments, the user interface application 152 may be executed by the processor 108 to process an interaction request 144 from a user device 102 (e.g., a VR/AR device) and generate an avatar 132 associated with the user device 102 for the user to interact with an entity for some application services. The server 104 may receive a plurality of user data objects 162 during an interaction between the avatar 132 and the entity in a virtual operation area 140. The object extraction model 154 may be executed by the processor 108 to extract user behavior objects 164 and user device objects 166 from the user data objects 162. The object extraction model 154 may include a natural language processing (NLP) algorithm configured to process textural information related to the user data objects 162 during the interaction. The machine learning model 156 may be executed by the processor 108 to process and map the user behavior objects 164 and the user device objects 166 to a set of virtual environment objects 146 in the virtual operation area 140. The virtual event rendering model 158 may be executed by the processor 108 to integrate the user behavior objects 164 and the user device objects 166 with the virtual environment objects 146 to generate corresponding customized environment virtual objects 148. The virtual event rendering model 158 may further be executed by the processor 108 to render the customized virtual environment objects 148 in a customized virtual environment 131 (e.g., 131a) corresponding to the interaction. The operation of the disclosed system 100 is described below.

Processing Interaction Data Objects

The server 104 may receive a plurality of user data objects 162 in a series of video frames during an interaction between the avatar 132 and the entity in a particular virtual operation area 140. The user data objects 162 represent interaction data associated with user behaviors and the user device operations when the avatar 132 interacts with the virtual environment objects 146 in the virtual operation area 140. Each user data object 162 may be included in a video frame corresponding to a timestamp 150. For example, the user data objects 162 may be associated with the use profile 134, audio data, video data, or textual information which the server 104 receives during the interaction. The user data objects 162 may include user behavior objects 164 and user device objects 166 associated with a series of changing events or instances caused by users behaviors and user device operations during the interaction. The server 104 may extract a set of user behavior objects 164 and a set of user device objects 166 from the set of the user data objects 162.

In one embodiment, each user behavior object 164 is associated with a type of user behavior to implement the interaction in the virtual operation area 140. Each user device object 166 may be associated with a user behavior object 164 and correspond to one or more virtual environment objects 146. The virtual environment objects 146 may be three dimensional (3D) spatial objects. The metadata of each virtual environment object 146 may include one or more features including positional characteristics, rotational angles, scaling information, texture, pixel density, a color, a dimension, mass, shading, a lighting, a texture, animation sequence, event scripts, sound, video, images, user device haptic feeds associated with the virtual environment objects, or a feature change caused by user inputs on the virtual environment object 146 during the interaction.

In some embodiments, the server 104 may detect a set of parameters from the user device 102 through the avatar 132 interacting with one or more virtual environment objects 146 during the interaction. The set of the parameters may include user device information, a device geographical location, user eye tracking, haptic signals, viewing resolution, motion sensing signals, etc. The user device information may include a device type or any device properties which the user uses to perform corresponding actions during the interaction. The user device objects 166 may be generated based on the set of the parameters of the user device 102 detected by the server 104.

User behaviors may include user preferences representing user interaction patterns and related context information. The user preferences may include a user device type and certain device properties that the user uses to perform certain behaviors during the interaction. For example, the user device type may be one of a plurality of types of AR/VR headsets compatible with and operating in the virtual environment 130. The server 104 may detect user preferences with certain user interaction patterns or user device properties during the interaction when the avatar 132 interacts with the set of the virtual environment objects 146 in the virtual operation area 140a.

The server 104 may update user behavior objects 164 in response to detecting and receiving new user behaviors through the user device 102 with the avatar 132 interacting with the virtual environment objects 146. The server 104 may update the set of the user device objects 166 in response to detecting one or more new parameters received from the use device 102 during the interaction.

Training a Machine Learning Model to Map User Behavior Objects and User Device Objects to Virtual Environment Objects and Generate Customized Virtual Environment Objects This process may be implemented by the server 104 to train the machine learning model 156 with a plurality of training datasets 172 associated with historical interaction objects 170 to determine corresponding customized virtual environment objects 148 for corresponding interactions. In some embodiments, the server 104 may store a plurality of training datasets 172 in the memory 114. Each training dataset 172 is associated with historical interaction objects 170 corresponding to an implemented interaction with the entity in a virtual operation area 140. The virtual operation area 140 may include a plurality of virtual environment objects 146. Each training dataset 172 comprises corresponding user behavior objects 164, user device objects 166, virtual environment objects 146, and customized virtual environment objects 148 associated with an implemented interaction in a corresponding virtual operation area 140.

In one embodiment, the server 104 may train the learning model 156 with the plurality of the training datasets 172 to process and map the user behavior objects 164 and the user device objects 166 to corresponding virtual environment objects 146 associated with an implemented interaction. The machine learning model 156 may be trained by the server 104 to determine the corresponding customized virtual environment objects 148 associated with the interaction based on the user behavior objects 164, the user device objects 166 and the corresponding virtual environment objects 146. In one embodiment, the server 104 may integrate the user behavior objects 164 and the user device objects 166 with the corresponding virtual environment objects 146 into a set of interaction objects 168 based on the mapping results described above. The server 104 may determine the corresponding customized virtual environment objects 148 associated with the interaction from the interaction objects 168.

Rendering Customized Environment Virtual Objects in a Customized Virtual Environment The server 104 may execute the virtual event rendering model 158 to render corresponding customized virtual environment objects 148 in a customized virtual environment 131 corresponding to the interaction. The interaction objects 168 may be represented by a plurality of spatial video frames 149 each corresponding to a timestamp 150. The plurality of the spatial video frames 149 may correspond to different timestamps in the time sequence. Each customized virtual environment object 148 of a spatial video frame 149 may correspond to a three dimensional (3D) spatial object in the customized virtual environment 131 associated with a timestamp 150. The server 104 may further execute the virtual event rendering model 158 to render the customized virtual environment objects 148 associated with the plurality of the spatial video frames 149 in a customized virtual environment 131 (e.g., 131a) corresponding to the interaction based on the corresponding timestamps.

Example Operational Flow for Auto-Generating and Sharing Customized Virtual Environments FIG. 3 provides an example operational flow of a method 300 of auto-generating and sharing customized virtual environments in the virtual environment 130. Modifications, additions, or omissions may be made to method 300. Method 300 may include more, fewer, or other operations. For example, operations may be performed by the server 104 in parallel or in any suitable order. One or more operations of method 300 may be implemented, at least in part, in the form of the information security software instructions 116 of FIG. 1, stored on non-transitory, tangible, machine-readable media (e.g., memory 114 of FIG. 1) that when executed by one or more processors (e.g., processor 108 of FIG. 1) may cause the one or more processors to perform operations 302-322.

The method 300 begins at operation 302 where the server 104 detects an avatar 132 associated with a user device 102 and a user interacting with a set of virtual environment objects 146 in a virtual operation area 140 (e.g., 140a) to perform an interaction with an entity.

At operation 304, the server 104 generates a set of user data objects 162 associated with the interaction and a user profile 134. The user data objects 162 may include user behavior objects 164 and user device objects 166 associated with a series of changing events or instances caused by users behaviors and user device operations during the interaction between an avatar 132 and the entity. Each user data object 162 corresponds to a timestamp 150 associated with the interaction.

At operation 306, the server 104 extracts a set of user behavior objects 164 and a set of user device objects 166 from the set of the user data objects 162. In some embodiments, each user behavior object 164 is associated with a type of user behavior corresponding to at least one virtual environment object 146. For example, the set of the user behavior objects 164 correspond to one or more user behaviors through the user device 102 and the avatar 132 on the plurality of the virtual environment objects 146 during the interaction. The server 104 may generate the set of the user behavior objects 164 based on the user behaviors, user interaction patterns, and the context information. Each user device object 166 may correspond to the at least one virtual environment object 146 associated with the user device 102 during the interaction. For example, the server 104 may detect a set of parameters from the user device 102 when the user interacts with the entity through the avatar 132 during the interaction in the virtual operation area 140. The set of the parameters may comprise a user device type, user eye tracking, haptic signals, viewing resolution, and motion sensing signals which are associated with the user device 102. The server 104 may generate the set of the user device objects 166 based on the set of the parameters received from the user device 102.

At operation 308, the server 104 applies a machine learning model 156 to map the set of the user behavior objects 164 and the set of the user device objects 166 to the set of the virtual environment objects 146 in the virtual operation area 140.

At operation 310, the server 104 integrates the set of the user behavior objects 164 and the set of the user device objects 166 with the set of the virtual environment objects 146 into a set of interaction objects 168 based on the mapping results.

At operation 312, the server 104 determines a plurality of customized environment virtual objects 148 for the interaction based on the set of interaction objects 168. Each customized virtual environment object 148 may represent a three dimensional (3D) spatial object corresponding to the timestamp 150.

At operation 314, the server 104 renders the plurality of the customized virtual environment objects 148 in a customized virtual environment 131 (e.g., 131a) corresponding to the interaction based on the corresponding timestamp 150. For example, the server 104 may render the customized virtual environment objects 148 as a plurality of spatial video frames 149 in a time sequence. The server 104 may monitor user behaviors and user device operations during the user interaction.

At operation 316, the server 104 may determine whether one or more new user behaviors are detected on one or more virtual environment objects 146 through the avatar 132 during the interaction.

At operation 318, in response to detecting one or more new user behaviors through the avatar 132, the server 104 updates the set of the user behavior objects 164 based on the detected user behavior from the avatar 132 interacting with one or more virtual environment objects 146.

At operation 320, the server 104 further determines whether one or more new parameters from the use device 102 are detected during the interaction.

At operation 322, in response to detecting one or more new parameters from the user device 102, the server 104 updates the set of the user device objects 166 with the one or more detected parameters. For example, the server 104 may detect one or more changes related to a viewing resolution or motion sensing signals from the use device 102.

At operation 324, the server 104 may modify the customized virtual environment 131 in synchronization with the updated user behavior objects 164 and the updated user device objects 166 for the interaction in the time sequence in real-time.

At operation 326, the server 104 presents the customized virtual environment 131 on the user device 102 to facilitate the user to conduct the interaction.

In some embodiments, the information security software instructions 116 associated with the operational flows and other described processes may be deployed into a practical application executed by the server 104 to auto-generate and share customized virtual environments 131 between users. The server 104 may store the customized virtual environment objects 148 in the memory 114 and associate them with the corresponding use profiles 134. The customized virtual environments 131 may be shared based on the identified user preferences. The user preferences may include using the same type of user device 102, choosing a certain scaling or color of the virtual environment objects 146, or performing certain interaction patterns during the interaction. For example, the server 104 may monitor the interaction events and identify interaction patterns for the same application services with the entity. The server 104 may present the corresponding customized virtual environment objects 148 to the users to their user devices 102 to share the customized virtual environments 131 between users during their interactions. For example, when the server 104 receives a new request 144 to interact with the entity, the server 104 may determine whether the new request 144 is related to an interaction associated with the customized virtual environment objects 148 stored in memory 114. The server 104 may identify that the user preferences related to the new request 144 match the customized virtual environment objects 148. The server 104 may present the customized virtual environment 131 with the customized virtual environment objects 148 to the user on the display 206 of the user device 102.

In some embodiments, the server 104 may derive context information about user disability to perform an interaction with one or more virtual environment objects 146 in the virtual operation area 140. The server 104 may detect user motions through the avatar 132 and the use device 102 to determine that the user has a certain disability to perform an action. For example, the server 104 may detect certain user moving speeds, moving styles, haptic feed, eye movements to identify the user needs and preferences to see certain color and scaling of virtual environment objects 146 presented in a virtual operation area 140. The server 104 may generate the corresponding customized virtual environment objects 148 to fulfill the user needs and preferences. For example, the server 104 may generate and update the corresponding user behavior objects 164 and user device objects 166 associated with the identified user disability based on the detected user behaviors, the user interaction patterns, and the context information. The server 104 may modify the customized virtual environment 131 in synchronization with the updated user behavior objects 164 and the updated user device objects 166 to facilitate user disability for performing the seamless interaction in real-time. In one embodiment, the user profile 134 may comprise user personal preference or disability information. The server 104 may verify the user identity based on the identified user disability from the interaction and the user profile 134.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
a memory operable to store:
a plurality of user profiles, wherein each user profile comprises authentication data configured to authorize a user device associated with a user to perform an interaction with an entity associated with a real-world environment; and
a processor operably coupled to the memory, the processor configured to:
detect an avatar associated with the user device and the user interacting with a set of virtual environment objects in a virtual environment for an interaction with the entity;
generate a set of user data objects associated with the interaction and a user profile;
extract a set of user behavior objects and a set of user device objects from the set of the user data objects, wherein each user behavior object is associated with a type of user behavior corresponding to at least one virtual environment object, and wherein each user device object corresponds to the at least one virtual environment object and is detected by the user device during the interaction;
apply a machine learning model to map the set of the user behavior objects and the set of the user device objects to the set of the virtual environment objects in the virtual environment;
integrate, based on the mapping, the set of the user behavior objects and the set of the user device objects with the set of the virtual environment objects into a set of interaction objects;
determine a plurality of customized environment virtual objects for the interaction based on the set of the interaction objects; and
render the plurality of the customized virtual environment objects in a customized virtual environment corresponding to the interaction;
wherein each user data object corresponds to a timestamp, and wherein the processor is further configured to:
render the customized virtual environment objects as a plurality of spatial video frames in a time sequence, each customized virtual environment object being a three dimensional (3D) spatial object corresponding to the timestamp;
update the set of the user behavior objects in response to detecting one or more new user behaviors through the avatar on one or more virtual environment objects;
modify the customized virtual environment in synchronization with the updated user behavior objects for the interaction in the time sequence in real-time; and
present the customized virtual environment on the user device to conduct the interaction.

2. The system of claim 1, wherein the processor is further configured to:
detect user behaviors and user interaction patterns during the interaction between the avatar and the set of the virtual environment objects in the virtual environment; and
verify a user identity based on the user interaction patterns and the user profile.

3. The system of claim 2, wherein the processor is further configured to:
derive context information about user disability to perform the interaction with one or more the virtual environment objects in the virtual environment; and
generate the set of the user behavior objects based on the user behaviors, the user interaction patterns, and the context information, the set of the user behavior objects corresponding to the plurality of the virtual environment objects during the interaction.

4. The system of claim 1, wherein the processor is further configured to:
detect a set of parameters from the user device during the interaction, the set of the parameters comprising a user device type, a user device geographical location, user eye tracking, haptic signals, viewing resolution, and motion sensing signals;
generate the set of the user device objects based on the set of the parameters;
update the set of the user device objects in response to detecting one or more new parameter from the use device; and
modify the customized virtual environment in synchronization with the updated user device objects for the interaction in the time sequence in real-time.

5. The system of claim 1, wherein each virtual environment object in the virtual environment comprises one or more features of the virtual environment object, wherein the one or more features comprise rotational angles, scaling information, a dimension, a color, a lighting, a texture, an animation sequence, or a feature change caused by user inputs on the virtual environment object during the interaction.

6. The system of claim 1, wherein the memory is further configured to:
store a plurality of training datasets in the memory, wherein the training datasets are associated with historical interaction objects corresponding to implemented interactions with the entity, and each training dataset comprises corresponding user behavior objects, user device objects, virtual environment objects, and customized virtual environment objects for a corresponding implemented interaction; and
train the learning model with the plurality of the training datasets to determine corresponding customized virtual environment objects for the corresponding interaction.

7. A method comprising:
detecting an avatar associated with a user device and a user interacting with a set of virtual environment objects in a virtual environment for an interaction with an entity;
generating a set of user data objects associated with the interaction and a user profile;
extracting a set of user behavior objects and a set of user device objects from the set of the user data objects, wherein each user behavior object is associated with a type of user behavior corresponding to at least one virtual environment object, and wherein each user device object corresponds to the at least one virtual environment object and is detected by the user device during the interaction;
applying a machine learning model to map the set of the user behavior objects and the set of the user device objects to the set of the virtual environment objects in the virtual environment;
integrating, based on the mapping, the set of the user behavior objects and the set of the user device objects with the set of the virtual environment objects into a set of interaction objects;
determining a plurality of customized environment virtual objects for the interaction based on the set of the interaction objects; and rendering the plurality of the customized virtual environment objects in a customized virtual environment corresponding to the interaction;
wherein each user data object corresponds to a timestamp, and the method further comprising:
rendering the customized virtual environment objects as a plurality of spatial video frames in a time sequence, each customized virtual environment object being a three dimensional (3D) spatial object corresponding to the timestamp;
updating the set of the user behavior objects in response to detecting one or more new user behaviors through the avatar on one or more virtual environment objects;
modifying the customized virtual environment in synchronization with the updated user behavior objects for the interaction in the time sequence in real-time; and
presenting the customized virtual environment on the user device to conduct the interaction.

8. The method of claim 7, further comprising:
detecting user behaviors and user interaction patterns during the interaction between the avatar and the set of the virtual environment objects in the virtual environment; and
verifying a user identity based on the user interaction patterns and the user profile.

9. The method of claim 8, further comprising:
deriving context information about user disability to perform the interaction with one or more virtual environment objects in the virtual environment; and
generating the set of the user behavior objects based on the user behaviors, the user interaction patterns, and the context information, the set of the user behavior objects corresponding to one or more user behaviors on the plurality of the virtual environment objects during the interaction.

10. The method of claim 9, further comprising:
detecting a set of parameters from the user device during the interaction, the set of the parameters comprising a user device type, a user device geographical location, user eye tracking, haptic signals, viewing resolution, and motion sensing signals;
generating the set of the user device objects based on the set of the parameters;
updating the set of the user device objects in response to detecting one or more new parameters from the use device; and
modifying the customized virtual environment in synchronization with the updated user device objects for the interaction in the time sequence in real-time.

11. The method of claim 7, wherein each virtual environment object in the virtual environment comprises one or more features of the virtual environment object, wherein the one or more features comprise rotational angles, scaling information, a dimension, a color, a lighting, a texture, an animation sequence, or a feature change caused by user inputs on the virtual environment object during the interaction.

12. The method of claim 7, further comprising:
storing a plurality of training datasets in the memory, wherein the training datasets are associated with historical interaction objects corresponding to implemented interactions with the entity, and each training dataset comprises corresponding user behavior objects, user device objects, virtual environment objects, and customized virtual environment objects for a corresponding implemented interaction; and training the learning model with the plurality of the training datasets to determine corresponding customized virtual environment objects for the corresponding interaction.

13. A non-transitory computer-readable medium that stores instructions that when executed by a processor, causes the processor to:
detect an avatar associated with a user device and a user interacting with a set of virtual environment objects in a virtual environment for an interaction with an entity;
generate a set of user data objects associated with the interaction and a user profile;
extract a set of user behavior objects and a set of user device objects from the set of the user data objects, wherein each user behavior object is associated with a type of user behavior corresponding to at least one virtual environment object, and wherein each user device object corresponds to the at least one virtual environment object and is detected by the user device during the interaction;
apply a machine learning model to map the set of the user behavior objects and the set of the user device objects to the set of the virtual environment objects in the virtual environment;
integrate, based on the mapping, the set of the user behavior objects and the set of the user device objects with the set of the virtual environment objects into a set of interaction objects;
determine a plurality of customized environment virtual objects for the interaction based on the set of the interaction objects; and
render the plurality of the customized virtual environment objects in a customized virtual environment corresponding to the interaction;
wherein each user data object corresponds to a timestamp, and wherein the instructions when executed by the processor further cause the processor to:
render the customized virtual environment objects as a plurality of spatial video frames in a time sequence, each customized virtual environment object being a three dimensional (3D) spatial object corresponding to the timestamp;
update the set of the user behavior objects in response to detecting one or more new user behaviors through the avatar on one or more virtual environment objects;
modify the customized virtual environment in synchronization with the updated user behavior objects for the interaction in the time sequence in real-time; and
present the customized virtual environment on the user device to conduct the interaction.

14. The non-transitory computer-readable medium of claim 13, wherein the instructions when executed by the processor further cause the processor to:
detect user behaviors and user interaction patterns during the interaction between the avatar and the set of the virtual environment objects in the virtual environment; and
verify a user identity based on the user interaction patterns and the user profile.

15. The non-transitory computer-readable medium of claim 14, wherein the instructions when executed by the processor further cause the processor to:
derive context information about user disability to perform the interaction with one or more virtual environment objects in the virtual environment; and generate the set of the user behavior objects based on the user behaviors, the user interaction patterns, and the context information, the set of the user behavior objects corresponding to one or more user behaviors on the plurality of the virtual environment objects during the interaction.

16. The non-transitory computer-readable medium of claim 15, wherein the instructions when executed by the processor further cause the processor to:
   detect a set of parameters from the user device during the interaction, the set of the parameters comprising a user device type, a user device geographical location, user eye tracking, haptic signals, viewing resolution, and motion sensing signals;
   generate the set of the user device objects based on the set of the parameters;
   update the set of the user device objects in response to detecting one or more new parameters from the use device; and
   modify the customized virtual environment in synchronization with the updated user device objects for the interaction in the time sequence in real-time.

17. The non-transitory computer-readable medium of claim 13, wherein the instructions when executed by the processor further cause the processor to:
   store a plurality of training datasets in the memory, wherein the training datasets are associated with historical interaction objects corresponding to implemented interactions with the entity, and each training dataset comprises corresponding user behavior objects, user device objects, virtual environment objects, and customized virtual environment objects for a corresponding implemented interaction; and
   train the learning model with the plurality of the training datasets to determine corresponding customized virtual environment objects for the corresponding interaction, wherein each virtual environment object in the virtual environment comprises one or more features of the virtual environment object, and wherein the one or more features comprise rotational angles, scaling information, a dimension, a color, a lighting, a texture, an animation sequence, or a feature change caused by user inputs on the virtual environment object during the interaction.

* * * * *